Sept. 28, 1965 P. SCHUTT 3,208,497
TIRE FOR VEHICLE
Filed May 1, 1963 3 Sheets-Sheet 1

INVENTOR.
Paul Schutt
by Bradley Cohn
ATTORNEY.

Sept. 28, 1965   P. SCHUTT   3,208,497
TIRE FOR VEHICLE
Filed May 1, 1963   3 Sheets-Sheet 2
FIG. 5
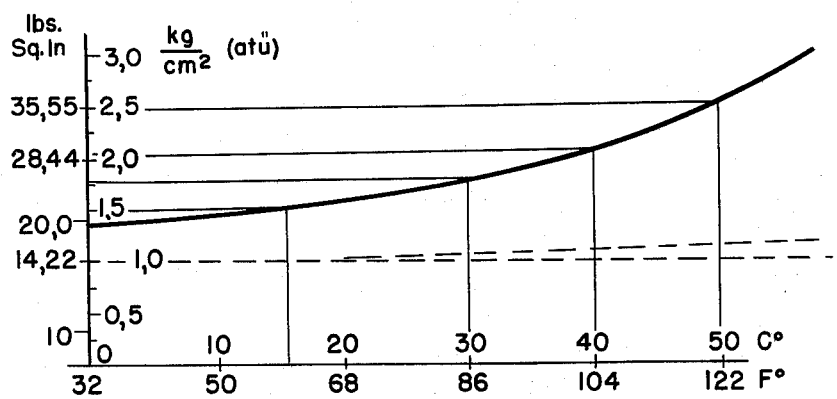
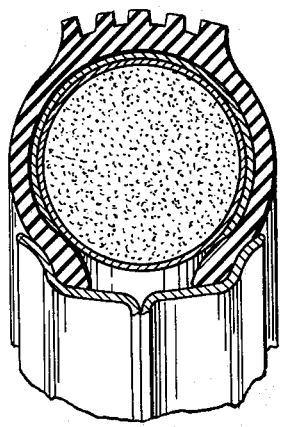
FIG.6
INVENTOR.
Paul Schutt
by Bradley Cohn
ATTORNEY.

Sept. 28, 1965  P. SCHUTT  3,208,497
TIRE FOR VEHICLE

Filed May 1, 1963  3 Sheets-Sheet 3

INVENTOR:
Paul Schutt
BY

United States Patent Office 3,208,497
Patented Sept. 28, 1965

3,208,497
TIRE FOR VEHICLE
Paul Schutt, Flensburg, Germany, assignor of forty-five percent to McArds Manufacturers' Agencies, Jackson Heights, N.Y., a corporation of New York
Filed May 1, 1963, Ser. No. 277,325
9 Claims. (Cl. 152—157)

This invention is an improved tire, particularly for motor vehicles.

More particularly, the invention is an improved safety tire which minimizes the hazards caused by the loss of air in penumatic tires particularly when damaged while in operation.

An object of the invention is an improvement in tires to reduce the hazards when in operation.

The present invention is incorporated in a number of different embodiments described herein.

In one such embodiment, the cavity within the tire shoe is entirely filled with a suitable type of cellular rubber, or similar elastic material including synthetic materials which are included in the term rubber as used herein.

In another embodiment the cavity is partially filled with cellular rubber, or one of the other materials named in the foregoing, and the remainder of the cavity is filled with a plurality of individual pneumatic air or gas filled tubes.

In yet another embodiment, the pneumatic air or gas filled tube has an additive in the form of a liquid having a boiling point within the temperature range of the tire when in operation, to produce an internal pressure, which when combined with that of the air or gas in the tire automatically adjusts to changes in tire stress due to changes in load and/or operating speeds or other changes to compensate therefor. This is one of the important aspects of the invention and may be advantageously applied not only to safety tires but to the ordinary single tube or tubeless pneumatic tire.

As is generally well understood, the sudden loss of air and pressure in pneumatic motor vehicle tires while in operation on the road is one of the greatest motoring hazards. As is also well understood this loss of air and pressure can be caused by punctures, excessive wear, blowouts, leaky valves, etc. In the case of tubeless tires, the cause is most generally attributable to a leak between the tire and the wheel rim.

The tire industry has made numerous attempts to lessen the hazards caused by defective operation of tires. These have included filling the space within the shoe with fibrous and viscous substances. They have included also chambering the air system and the employment of puncture-proof rubber inserts and the partition of the space in the tire casing into two compartments comprising an outer air space and an inner high pressure tube of rubber or other element. However, these attempts have alleviated the difficulties to only a limited extent.

Cellular rubber-like fillers in tires have been tried heretofore but except for the tire arrangements disclosed in Federal German Patent No. 877,412, granted to applicant, to which further reference is made hereinafter, such tires have not had the desirable characteristic of correspondence between the wheel load and the constant inner gas pressure of the cellular rubber filler. The employment of cellular rubber filler entirely within a tire shoe has been made possible only by correctly controlling the air pressure within the cellular rubber.

The present invention, as described hereinafter, essentially eliminates prevailing deficiencies in so-called safety type tires and the present application imparts information ascertained through experimentation and experience in the use of cellular rubber materials and such materials in combination with a plurality of pneumatic tubes. It describes the effect of various conditions of these and of gases, such as air and other, the effect of water vapor or steam or the vapor or steam of other liquids as well as the effect of the use of elastic materials whereby the required inner pressure may be produced. This eliminates the use of air valves or pumps or compressed air supplied externally except in special instances.

The cellular rubber, which has been found suitable for the present purpose, contains gases in an amount ranging from 50% to 90%. The gas is confined in countless individual cells, or gas bubbles, isolated one from another and from the atmosphere. The number of such gas bubbles in even a small tire will be in the millions. The rubber per se is relatively incompressible, as compared with the compressibility of the cells or gas or air bubbles dispersed within it.

In using this cellular rubber, experiments have been conducted in which the tire casings have been severely slashed by a knife for instance, exposing large areas of the cellular rubber. Road testing following such injury to the tire casing, and exposure of the inner cellular rubber filling, have proven that no measurable pressure losses have occurred. The road test indicated that the cellular rubber was so cohesive that, notwithstanding the exposure of wide areas of it to the road surface, the cellular rubber did not protrude through the opening as a result of the pressures and other forces incident to road operation. These tests indicated that the dangerous flattening of tires is eliminated when the space within the tire shoe is entirely filled with cellular rubber, or when the cellular rubber occupies the preponderant space within the shoe, and that cellular rubber core tires are entirely satisfactory as safety tires. However, when cellular rubber is used in the core of tires, it is necessary that the inner pressure, that is the pressure of gases or air within the individual gas bubbles is suitable for the conditions under which the tire is to be operated taking into consideration the factors of wheel load, and area of contact of the tire shoe with the road surface.

The cellular rubber safety tire of the present invention is illustrated in a number of embodiments, each of which will be described hereinafter.

An important aspect of the use of cellular rubber in safety tires is the manner of producing the proper pressure within the gas bubbles in the cellular rubber, as well as within the individual pneumatic tube compartments, in the embodiments in which pneumatic tube compartments are employed in combination with cellular rubber.

These and other aspects of the invention may be understood from reference to the associated drawings, when read with reference to the accompanying description, which taken together describe a number of preferred embodiments in which the invention is presently incorporated. It is to be understood that the invention is not limited to the specific embodiments disclosed herein, but may be practiced in other forms which will readily be suggested to those skilled in the art from a consideration of the following.

In the drawings:

FIG. 5 is a graph used in explaining the invention;

FIG. 6 shows a tire having a single pneumatic tube filled with air or gas and having a low boiling liquid additive for automatically adjusting the pressure therein to change in external tire stress;

The first embodiment resembles the arrangement disclosed in Federal German Patent No. 877,412 mentioned in the foregoing. In this embodiment, according to the present invention, any tire 10, such as any standard size commercial tire, is tightly filled with cellular rubber 12 having a large volume of gas holding bubbles 14. The cellular rubber may be in the form of molded pieces for instance or in layers of cut sheets. After filling the entire space of the cavity within the shoe, the tire may have the appearance indicated in FIG. 1 in which the gas bubbles are relatively large and the tire is distended somewhat in width.

Figure 1:
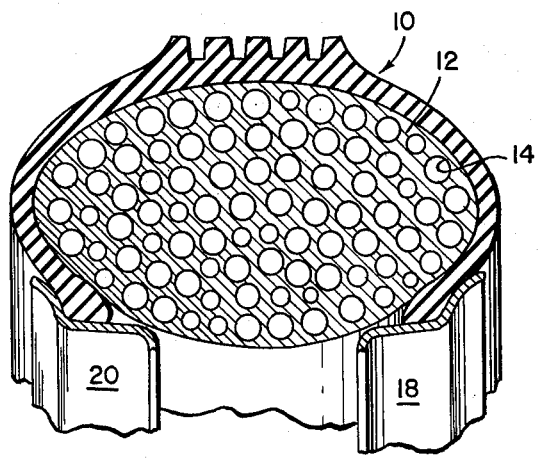
FIG. 1 shows a tire casing entirely filled with cellular rubber so that the casing is somewhat distended prior to tightening for operation.
Figure 2:
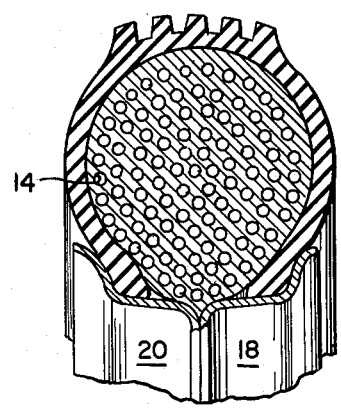
FIG. 2 shows the tire of FIG. 1 after tightening of the shoe about the cellular filling so that the tire is ready for operation.

As seen in FIG. 1, the tire rim comprises two spaced parts 18 and 20. After filling with the cellular rubber, the two spaced parts of the divided wheel rim are drawn together as shown in FIG. 2. It will be observed that as a result of this tightening, the cross sectional area of the tire and the total cross sectional area of the cellular rubber filling and particularly of the gas bubbles therein, indicated by the circles, have been considerably reduced. The pressure within the tire shoe has been considerably increased. The reduction in cross sectional area of the cellular rubber mass is almost entirely as a result of a compression of the bubbles.

To understand how the pressure within the shoe has been increased, a comprehension of two factors is of primary importance:

(a) The rubber per se in the cellular rubber is relatively incompressible as compared to the bubbles and the reduction in cross sectional area has been effected almost entirely by compressing the gas bubbles. This compression of the gas bubbles increases the pressure exerted by the cellular rubber filler within the tire casing.

(b) The increase in pressure caused by the tightening of the rim and resulting compression of the bubbles expressed mathematically is equal to the square of reduction of the diameter of the cross section, an effect which is applied equally to the entire tire volume according to Guldin's rule. For example, if the diameter of the cross section of the tire is reduced from 100 millimeters to 70 millimeters by the tightening process, the resulting cross sectional area and thus the volume of the tire will be approximately halved, the area prior to reduction being 2500 pi square millimeters and after reduction being 1225 pi square millimeters for the assumed dimensions. The internal pressure, if filled with pure air, would be doubled, that is to say, an increase in pressure of one atmosphere per unit area would have been achieved. Through the use of the relatively incompressible rubber and the correct choice of the volume of gas bubbles to the combined volume of the cellular rubber plus the volume of the gas bubbles, and their ratios before and after tightening any desired pressure within a range can be achieved and the pressure within tires to be applied to any particular tire load or climatic or other conditions can be achieved.

Wheels having two halves or wheels equipped with a removable or divisible wheel rim are particularly suitable for use with the arrangement described in the foregoing. Indivisible wheels and wheels with a drop-base rim are better adapted for service with a tire in accordance with another embodiment to be described hereinafter. It will be observed that no air valve is employed in the embodiment described in the foregoing. However, it is possible to measure the pressure within the tire by known measuring devices such as those which measure the depth of the indentation in the tire side wall.

It is also possible to determine the internal pressure of a cellular rubber filled tire by comparative measurements with exactly adjusted pneumatic tires.

Among the advantages achieved by the cellular rubber filled tire are the following. Certain of these advantages are to be found in the use of safety tires of other types. Others are peculiar to the use of cellular rubber type safety tires only. And it is considered that in cases in which certain of the advantages are realizable also in tires of other types they are more certainly available in the cellular rubber tire.

(1) The tire cannot flatten due to puncture or other hazard. Therefore, steering and driving are not impaired and accidents incident to tire road hazards are minimized.

(2) The cellular rubber tires may be substituted for regular commercial tires without any change since there is no difference in the external physical characteristics, and as shown by experiments, there is no difference in the driving characteristics between the two.

(3) In operation, the tire is independent of air pumps or compressed air which are not always readily available.

(4) As a result of the self-cohesion of the cellular rubber, which always exceeds the inner pressure, the cellular rubber will always remain inside the tire shoe even in case of severe damage to the tire shoe.

(5) The effect of imperfections in the structure of the tire shoe or in the cellular rubber or safety of operations are greatly minimized.

(6) The cellular rubber safety tire may be balanced in the same manner as any ordinary tire and balancing is required less frequently.

(7) Since the cellular rubber tire is not subject to random effect of road hazards, it is not necessary to make changes or repairs on the road and they can be made at a predetermined time and place greatly minimizing the chances of physical injury incident to the changing and repair of tires on the road.

(8) The need for carrying tools for tire repairs on the road, such as jacks, and other incidental tools is eliminated.

(9) Change of tires on the road is eliminated.

(10) There is no need for carrying spare tires.

In the second embodiment of the invention, instead of filling the entire internal space within the shoe with cellular rubber, the space is filled with a combination of cellular rubber, which takes up the larger portion of the space and a number of individual tubes.

Figure 3:
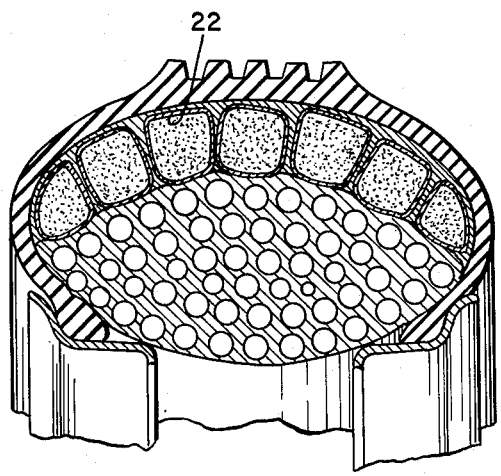
FIG. 3 shows a tire shoe enclosing a combined filling of cellular rubber and a plurality of individual pneumatic tubes, having fillings of air or gas, and an additive of a selected low boiling liquid, to automatically adjust the tire pressure to changes in external tire stress in operation. The figure shows the shoe somewhat distended prior to tightening.

In this second embodiment, a plurality of relatively small individual inflated pneumatic inner tubes 22 are placed within the shoe together with the cellular rubber. As shown in FIG. 3, the individual small pneumatic tubes preferably occupy the space adjacent to the road-engaging surface of the tire, but it is to be understood that they may be disposed anywhere within the casing and may be dispersed rather than localized. In assembling the preferred embodiment of this tire, the valveless tubes are first inserted adjacent the tire's outer rim and then cellular rubber, adequate to fill the remaining space, and to distend the shoe slightly, is inserted in the shoe cavity.

Figure 7:
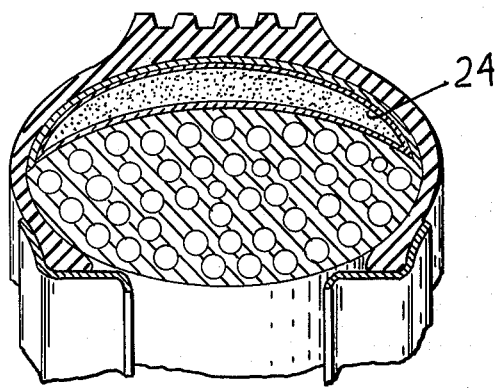
FIG. 7 shows a tire shoe enclosing a combined filler of cellular rubber and a single pneumatic tube 24 filled with air or gas and having a low boiling liquid additive for automatically adjusting the pressure therein to changes in external tire stress.

In FIGS. 3 and 7, the embodiments are shown in coaction with a divided wheel rim as in FIG. 1.

Figure 4:
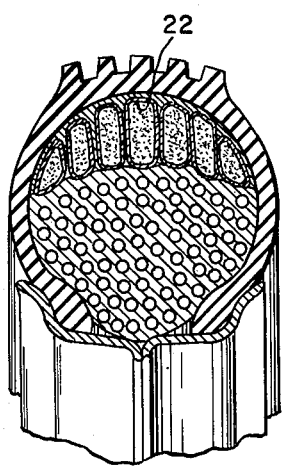
FIG. 4 shows the tire of FIG. 3 after tightening so that it is ready for operation.
Figure 8:
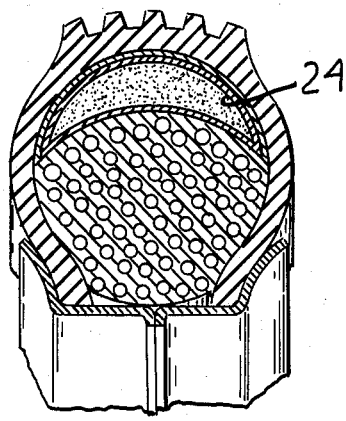
FIG. 8 shows a tire of FIG. 7 after tightening so that it is ready for operation.

FIGS. 4 and 8 are comparable to FIG. 2 in that they show the form assumed by the plurality of individual pneumatic tubes 22 or single tube 24 and the cellular rubber after compaction due to the tightening of the divdied wheel rims. After tightening, the individual pneumatic tubes and the cellular rubber are under the same pressure since the cross section of each has been similarly reduced.

This embodiment is especially adapted for use in very large, heavy tires as the amount fo cellular rubber required and its weight are thereby materially reduced.

It should be apparent from a consideration of FIGS. 3 and 4 that the incidence of serious effect due to puncture is considerably less than when the tire has but a single pneumatic inner tube as, in the case of ordinary puncture, a single one of the individual pneumatic tubes will be affected. In the case of a single penetration by a nail, for instance, the motor vehicle having tires arranged as in the embodiments of FIGS. 3 and 4, will retain full steering ability and maneuverability.

In a third embodiment in accordance with the present invention, the embodiment of FIG. 2, that is the embodiments shown in FIGS. 3 and 4, has an added feature. This involves the introduction of a quantity of one or another of several liquids, each having a low boiling point, into each of the individual pneumatic tubes, in addition to the air or gas therein. After filling with air and the chosen liquid, the tubes are sealed with a synthetic adhesive, for example, which is preferred to the usual metal valves to facilitate balancing.

When the term "gases" is used in this application, what is meant is such gases, or gaseous mixtures, only, such as air, which will not condense under practical operating conditions, but will always remain in the gaseous condition of the so-called "perfect" gases.

When the term "steam" is used in this application, it is meant the gaseous state of aggregation of low boiling liquids, which gases return to the liquid state when sufficiently cooled or subjected to pressure, respectively.

The use of steam, or the dry saturated steam of low boiling liquids, respectively, as a filling of the tubes, instead of air, is not in itself an innovation.

Reference is made to the Federal German Explanatory Document No. 1,031,665, class 63e, dated January 3, 1955/June 4, 1958.

The former application, however, teaches only the replacement of compressed air and the advantage of the use of gas filled tubes because of their longevity. It does not propose the use of steams or dry saturated steams in safety tires. Further, it teaches that the use of low boiling liquids is disadvantageous and means are proposed for counteracting their effect.

Suitable liquids in addition to ether and methyl chloride ($CH_2Cl_2$) are especially known refrigerants, such as ethyl chloride ($C_2H_5Cl$), monofluortrichloromethane ($CFCl_3$), monofluor-dichloromethane ($CHCl_2F$), trifluortrichloroethane ($C_2Cl_3F_3$), tetrafluor-dichloroethane ($C_2F_4Cl_2$), and others. Their boiling point depends not only on the relatively low temperature but also on the pressure to which the liquids are subjected.

While the gases or gaseous portions, respectively, contained in the cellular rubber and in the tubes are considered "perfect gases" in that they follow the Law of Mariotte-Gay-Lussac, the same is not true of the vapors of low boiling point liquids in the tubes. Further considerations applying to absolute temperature (T) do not relate to these liquids. The only characteristics which are of importance are their boiling temperature and their corresponding steam pressure. The steam pressure curve is definitely a parabola. (See FIG. 5). This controls their availability for use in the present invention.

According to the above mentioned law, the pressure of perfect gases, assuming the same volume, changes only according to their absolute temperatures.

In this third embodiment of the present invention, a characteristic of steam (vapor) pressure of low boiling liquids in an unchanged volume is being exploited. In an unchanged volume, that is in a closed container such as is represented by a tire, the steam (vapor) pressure of low boiling liquids will rise when the temperature rises and it will rise considerably more than does the pressure in the air or gas in the tube. Advantage is being taken of this characteristic in this invention for the purpose of achieving a rise in pressure, and additionally, an automatic, thermostatic effect, adjustable in advance. As a result of this, when the tire heats up in operation, the tire pressure will automatically increase also without the necessity for taking any other measures. This increase is considerably higher than in the case when pure gas fillings alone are employed. Even with small temperature differences occurring in practice, the increased pressure of the low boiling liquids will automatically compensate even in response to very little heat.

The heating of the tire results from the effect of greater stress caused by increased wheel load or higher speed of operation. When this happens, it is desirable, if not necessary, that the tire pressure be increased correspondingly. In accordance with the present invention, this compensating increase in pressure results automatically from the increased vapor pressure within the pneumatic tube in response to the higher operating temperature of the tire when applied to a predetermined amount of a selected low temperature boiling liquid such as one of those identified in the foregoing.

FIG. 5 shows data relating to this characteristic which was obtained in actual tests.

As a result of this feature of the invention, it is possible, without any external adjustment, as a result of the automatic increased vapor pressure caused by the effect of increased tire temperature on the vapor pressure, due to increased tire load, or increased stress from any cause, to operate a vehicle at a slow rate of speed over difficult terrain at a considerably lower tire pressure and then, in response to the automatic internal pressure adjustment, to operate the vehicle when fully loaded or at a higher rate of speed without adverse effect. As shown in FIG. 5, a temperature difference of only 20 degrees centigrade is sufficient to raise the tire pressure from 1.6 atmospheric units to 2.1 atmospheric units. Thus a change in tire temperature safely within the operating temperature limits, effects appreciable changes in pressure. It is possible to arrange a tire such as is shown in FIGS. 3 and 4 so as to obtain pressure changes ranging from a desired minimum to a desired maximum for operation under particular load, road or climatic conditions. When the variations in load and in stress are small, the pressure differences will also be small. When the changes are appreciable, the pressure changes will be correspondingly wide. The changes in pressure obviously will both increase and decrease as required as the vapor in the tire will recondense into a liquid as the load and stress on the tire are reduced and the temperature of the tire reduces responsibly.

Adjustment to extreme climatic temperatures is effected by the choice of a suitable quantity of a suitable liquid with a suitable boiling point. Normal climatic and other external temperature changes generally do not influence the automatic action, but they may have a complementary effect in that they may cause the automatic stabilization at an optimum value to be delayed or hastened in some degree. The gas or air enclosed in the tire do not cause any appreciable differences in pressure therein as a result of the temperature changes in the tire due to changes in stress in operation since magnitudes of these changes throughout the operating temperature range are relatively small increments related to an absolute temperature of −273 degrees centigrade. This differential in the gas pressure, that is the effect of the changes which are related to absolute temperature, is represented in FIG. 5 by the broken line and it is obvious that it is so small as to be almost without significance. Moreover, Dalton's Law applies to the combination of the gas and the vapor.

The computation of the desired tire pressures and the appropriate minimum and maximum values can be controlled by the proper choice of the volume of the tubes which are employed, the particular kind and quantity of the liquid which is used and the specific vapor volume.

This information can be obtained by consulting available tables or can be determined empirically by tests for specific cases.

Attention is specifically called to the fact that, in one of its aspects, the present invention does not require the use of cellular rubber. The use of cellular rubber is indicated in tires which are to operate on the safety principle, that is for tires which are to insure against certain of the effects of road hazards such as the maintenance of roadability and the control of car direction notwithstanding tire casing damage. In the further important aspect of the invention, that is in automatic compensation for changes due to increased load or higher operational speeds by changes in internal vapor pressure due to the introduction of controlled kinds and quantities of low boiling liquids, the invention is not limited to the use of a plurality of pneumatic tubes enclosed within the casing but is equally applicable to tires having but a single pneumatic inner tube as indicated in FIG. 6. Further the automatic pressure adjustment feature of the invention, due to the use of a selected quantity of a selected low temperature boiling liquid obviously may be practiced with any safety tire which is in any part pneumatic by use of the low temperature boiling liquid additive to the usual gas or air content.

There are additional desirable characteristics and advantages of cellular rubber safety tires incorporated in certain of the embodiments mentioned in the foregoing:

(1) When they are employed with divisible wheel rims, the cellular rubber safety tires can be used with tire pressures up to as much as 10 atmospheric units.

(2) Cellular rubber safety tires can also be used with the drop-base tire rim widely used in the tire industry. This is particularly true of small tires operating at the usual normal pressures. Such tires may be assembled advantageously at temperatures at which the liquids used in the pneumatic tubes are not yet in the evaporated condition. In order to facilitate adjusting the selected low temperature boiling liquid, the multiple tubes may be disposed adjacent the wheel rim. Valves may be inserted into the several tubes through the wheel rim for application of the desired quantity of liquid at any time without dismantling.

(3) The fact that the adjustment of the tire pressure to the driving and load conditions is in all cases fully automatic saves time and labor in operation.

(4) When ordinary pneumatic tires are driven at pressures which are too low and later are taxed more heavily, the rise in temperature may exceed the permissible maximum. In tires made in accordance with the present invention, internal pressure rises at a faster rate than the temperature, so that the tire temperature does not exceed a permissible limit.

(5) The stabilization of the tire pressure at optimum values can be such that no excessive undesired change in the tire pressure and in the automatic pressure adjustment will occur even when more than one of the tubes of the multiple tube system are damaged, in cases where a plurality of pneumatic tubes are used either alone, or in combination with the cellular rubber, as shown in FIGS. 2 and 3. In such case, the reduced tire pressure within the tire, as a result of the damaged tube or tubes, is immediately compensated fully, or in part, by increased pressure due to the effect of lower tire pressure on the vapor of the low boiling liquid. This may be understood from reference to FIG. 5. The increased pressure in the undamaged tubes tends to balance the loss of pressure due to the damaged tube or tubes.

A slight excess in the quantity of low boiling liquids employed cannot cause excessive high pressure, as the adjustable pressure in the tire will, of itself, prevent the development of excessive vapor pressure. The type of the liquid and its boiling point alone determine the amount of the pressure and the pressure changes. They do not affect the amount of a possible excess pressure, which is a desirable characteristic. In fact, a certain excess is advantageous generally, in order to compensate for the losses caused by long term diffusion. A small surplus is also advantageous for aiding in the automatic stabilization of tire pressure when, due to defects in the shoe, one or more of the pneumatic tubes, are damaged as mentioned in the foregoing. It is emphasized that the pressure adjustment due to the vapor pressure and the low boiling point liquid is automatic. The driver, therefore, obviously does not have to make any stops because of changes in tire pressure. Ordinarily, the driver is completely unaware of the phenomenon.

There is another feature of the invention to which attention is now directed. In instances, where pneumatic tubes having quantities of low boiling point liquids are used, it is possible for these liquids or their vapors to permeate or diffuse through the walls of the tube because of inner overpressure. How this is prevented in accordance with the present invention will now be described.

A simple and effective manner of preventing diffusion is the use of anti-diffusion agents. These may be employed to advantage generally and their use is appropriate even with the relatively diffusion-proof synthetic tubes, such as those of butyl. Before the low boiling point liquid is inserted or simultaneously with its insertion, a liquid having a stronger adherence to the material of the tubes than has the low boiling point liquid is inserted. The selected material obviously should not react chemically with the tube or the other materials therein. One of the advantages of this process is that only a few cubic centimeters of any one of a number of suitable tube sealants are required. Especially suitable for this purpose are, among others, silicon oils, vegetable oils, such as peanut oil, glycols and others. Such materials are adequate for completely sealing even when used alone. In such cases, such as for example, for tires under anomalous high pressure, where an even greater anti-diffusion effect is required, such sealants may be used as an intermediate layer between two encased and sealed tubes.

The graph, FIG. 5, shows data collected during operational tests of the present invention. The ordinate shows tire pressure in atmospheric units in pounds per square inch and in kilogram per cubic centimeter. The abscissa shows the temperature in Fahrenheit degrees and in centigrade degrees. The dotted line of the graph of FIG. 5 shows the variation in pressure with changes in temperature of the gas/air portion. It will be observed that this change is almost negligible over most of the operational range. For instance, from 0 degrees centigrade to 50 degrees centigrade, the pressure rises from one atmospheric unit to approximately 1.12 atmospheric units, a rise of only twelve hundredths of an atmospheric unit.

The full line graph in FIG. 5 relates to the characteristic of the low boiling point liquid which is inserted in the pneumatic units. In this case, it will be observed that the changes in pressure with changes in temperature are much more marked than in the case of the air or gas portion of the pneumatic tire filler. It will be observed that in the range from 0 degrees centigrade to 50 degrees centigrade the pressure, due to the vaporization of the low boiling point liquid has nearly doubled. The change in pressure over this range of temperature rises from apporximately 1.35 atmospheres to 2.5 atmospheres. This change in pressure due to changes in vapor pressure can rise to about five times the original pressure when alone without the air or gas portion.

Attention is particularly called to the fact that the invention, in one of its aspects, depends upon the introduction of controlled amounts of air or gas with a controlled amount of a low boiling liquid, to produce the pressure changes requisite for the particular service to which the tire is to be subjected.

A certain amount of gas or air must always be present for two purposes:

(1) To inflate the tire;

(2) To control the effect of the pressure changes due to the vaporization of the low boiling point liquid.

Without the proper amount of air or gas in the pneumatic tube, the changes in pressure due to the pressure changes of the vapor of the low boiling liquid relative to the changes in temperature would be so steep that it would be difficult to control the tire pressure.

What is claimed is:

1. A tire of the safety type, said tire having a tire casing, said casing having a filler, said filler comprising cellular rubber and a pneumatic tube, said cellular rubber and said pneumatic tube disposed in superposed layers within said casing and filling the entire space within said casing, said pneumatic tube being disposed radially outwardly of said cellular rubber and said rubber occupying at least half of the cross-section of said filler.

2. A pneumatic tire, said tire having automatic means for adjusting the pressure therein to accommodate to varying conditions of load and speed, said means comprising an additive to the usual gas or air tire filling, said additive being a quantity of a liquid having the characteristic that it boils at temperatures within the range of temperatures normally produced within said tire in operation, to thereby produce a vapor pressure within said tire, so that the combined pressure of said air or gas and said vapor varies in proportion to changes in the temperature at which said tire is operated.

3. A safety tire having a casing tightened about a combined filler, said filler comprising a plurality of individually inflated pneumatic tubes, and comprising also cellular rubber, said rubber having a great number of individual air bubbles distributed through its mass, said rubber relatively incompressible as compared with said bubbles, said tightening substantially reducing the volume and cross sectional area of the space occupied by both said tubes and said bubbles, to produce an internal pressure within said casing.

4. The method of adjusting the internal pressure of a pneumatic tire to variations in tire stress, due to differences in the load and speed of operation, which comprises varying the internal pressure of the tire due to the vaporization of a liquid which boils and varies relatively widely in pressure in response to the variations in temperature produced in said tire by said load and speed of operation, which widely varying pressure when combined with the more slowly varying pressure of the air or gas within said tire, neutralizes the effect of said changes in weight and speed of operation.

5. A tire comprising a casing, a plurality of individual inflated pneumatic tubes, each of relatively small cross section, and cellular rubber, said rubber having a very large number of cells or bubbles therein, said tubes having a liquid therein, said liquid having the characteristic that it boils and thereby produces a pressure which varies widely with the variations in operating temperatures of the tire, so that, when combined with the relatively small changes in pressure of the usual gas or air filling, the changes in the external tire pressure, due to changes in load or other operating conditions, are compensated.

6. A process for producing increased interior pressure in a tire of the safety type, said tire having a substantial partial filling of cellular rubber, said rubber having a large volume of compressible gas bubbles in a substantially less compressible rubber mass, the remainder of said filling consisting of a plurality of individual gas inflated pneumatic tubes, said process comprising overfilling sufficiently to cause a limited distention and then tightening to substantially compress the volume occupied by said bubbles and said tubes to thereby produce an internal pressure and other characteristics similar to those of a pneumatic tire.

7. A process in accordance with claim 6, in which the pressure is automatically adjusted to increases in stress, caused by changes in tire load and/or speed, by supplementing the relatively narrow changes in the air or gas pressure, caused by operational temperature changes, with wider changes in pressure by incorporating with the gas in said tire a liquid having a boiling point within the operating temperature range of said tire.

8. A tire having a casing and a cavity within said casing, a plurality of individual air or gas inflated pneumatic tubes threading the space directly beneath the road-engaging surface of said casing, said tubes filling a substantial portion of said cavity, cellular rubber, said rubber filling the remainder of said cavity, said cellular rubber having a large volume of compressible air bubbles in a rubber mass, the rubber per se in said cellular rubber being relatively incompressible with relation to the compressibility of said bubbles, a liquid in each of said tubes, said liquid having such characteristics that it vaporizes at a temperature within the operating temperature range of said tire, and the resultant vapor changes in pressure widely with respect to the narrow changes in pressure of said gas or air within said tubes due to said changes in temperature, to tend to compensate for changes in stress applied to said tire in operation.

9. A tire of the safety type, said tire having a tire casing, said casing having a filler, said filler comprising cellular rubber and a pneumatic tube, said cellular rubber and said pneumatic tube disposed in superposed layers within said casing and filling the entire space within said casing, said cellular rubber having a great number of individual air bubbles distributed throughout its mass, and a quantity of liquid in said bubbles and said pneumatic tube, said liquid having its boiling point within the operating temperature ranges of said tire to increase the pressure in said tire upon an increase in temperature.

References Cited by the Examiner

UNITED STATES PATENTS

| | | | |
|---|---|---|---|
| 799,859 | 9/05 | Magowan | 152—336 |
| 1,169,964 | 2/16 | Kelly et al. | 152—313 X |
| 1,341,942 | 6/20 | Stephens | 152—313 |
| 1,755,359 | 4/30 | Moses | 244—97 |
| 2,166,511 | 7/39 | Witzenmann | 152—157 |
| 3,022,810 | 2/62 | Lambe | 152—157 |

FOREIGN PATENTS

| | | |
|---|---|---|
| 877,412 | 5/53 | Germany. |

ARTHUR L. LAPOINT, *Primary Examiner.*